United States Patent
Park et al.

(10) Patent No.: US 11,575,145 B2
(45) Date of Patent: Feb. 7, 2023

(54) HEXAGONAL COLUMN-SHAPED BATTERY CELL, MANUFACTURING METHOD THEREFOR, AND BATTERY MODULE COMPRISING SAME

(71) Applicant: LG CHEM, LTD., Seoul (KR)

(72) Inventors: Min-Hee Park, Daejeon (KR); Ha-Neul Yoo, Daejeon (KR); Jong-Soo Ha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 194 days.

(21) Appl. No.: 16/959,027

(22) PCT Filed: Aug. 26, 2019

(86) PCT No.: PCT/KR2019/010867
§ 371 (c)(1),
(2) Date: Jun. 29, 2020

(87) PCT Pub. No.: WO2020/050534
PCT Pub. Date: Mar. 12, 2020

(65) Prior Publication Data
US 2020/0358126 A1 Nov. 12, 2020

(30) Foreign Application Priority Data
Sep. 5, 2018 (KR) .......................... 10-2018-0106083

(51) Int. Cl.
*H01M 10/04* (2006.01)
*H01M 10/613* (2014.01)
(Continued)

(52) U.S. Cl.
CPC ..... *H01M 10/0431* (2013.01); *H01M 10/613* (2015.04); *H01M 10/64* (2015.04); *H01M 10/6555* (2015.04)

(58) Field of Classification Search
CPC ........... H01M 10/0431; H01M 10/613; H01M 10/64; H01M 10/6555; H01M 10/045;
(Continued)

(56) References Cited

U.S. PATENT DOCUMENTS

2010/0310924 A1  12/2010  Kaneda et al.
2012/0164494 A1  6/2012  Schaefer et al.
(Continued)

FOREIGN PATENT DOCUMENTS

CN   102593524 A   7/2012
CN   202503077 U   10/2012
(Continued)

OTHER PUBLICATIONS

Supplementary European Search Report mailed in EP 19 85 7863 dated Sep. 6, 2021.
(Continued)

*Primary Examiner* — Kaity V Chandler
(74) *Attorney, Agent, or Firm* — Birch, Stewart, Kolasch & Birch, LLP

(57) ABSTRACT

A battery cell having an electrode assembly having a hollow structure with a hexagonal prism-shaped hole at a center, of which an exterior of the electrode assembly is in a shape of a hexagonal prism, and a cell case in which the electrode assembly is received, of which an exterior of the cell case is in a shape of a hexagonal prism is provided.

7 Claims, 9 Drawing Sheets

(51) Int. Cl.
*H01M 10/64* (2014.01)
*H01M 10/6555* (2014.01)

(58) Field of Classification Search
CPC .. H01M 10/647; H01M 50/102; H01M 10/04; Y02E 60/10; Y02P 70/50
See application file for complete search history.

(56) References Cited

U.S. PATENT DOCUMENTS

| | | | |
|---|---|---|---|
| 2013/0209858 A1 | 8/2013 | Schmitt et al. | |
| 2014/0227583 A1 | 8/2014 | Do et al. | |
| 2016/0141560 A1 * | 5/2016 | Lim | H01M 50/213 429/94 |
| 2017/0005382 A1 * | 1/2017 | Kim | H01M 50/15 |
| 2017/0200991 A1 | 7/2017 | Nam et al. | |
| 2017/0210587 A1 | 7/2017 | Canning et al. | |

FOREIGN PATENT DOCUMENTS

| | | | | |
|---|---|---|---|---|
| CN | 106025366 A | * | 10/2016 | ............ Y02E 60/10 |
| CN | 106026366 A | | 10/2016 | |
| CN | 106532134 A | * | 3/2017 | ........ H01M 10/0585 |
| CN | 206076410 U | | 4/2017 | |
| CN | 207517751 U | * | 6/2018 | ............ Y02E 60/10 |
| EP | 2 680 361 A1 | | 1/2014 | |
| EP | 2 999 041 A1 | | 3/2016 | |
| JP | 9-266012 A | | 10/1997 | |
| JP | 2002280055 A | * | 9/2002 | ............ Y02E 60/10 |
| JP | 2007073933 A | * | 3/2007 | ............ G11C 11/16 |
| JP | 2007207649 A | * | 8/2007 | ............ Y02E 60/10 |
| JP | 2008109165 A | * | 5/2008 | ............ G11C 11/16 |
| JP | 2008134049 A | * | 6/2008 | ............ G11C 11/16 |
| JP | 2010-080427 A | | 4/2010 | |
| JP | 2013-519987 A | | 5/2013 | |
| JP | 5458898 B2 | | 4/2014 | |
| KR | 10-2014-0066474 A | | 6/2014 | |
| KR | 10-2015-0050435 A | | 5/2015 | |
| KR | 10-2016-0069779 A | | 5/2016 | |
| KR | 10-2016-0125829 A | | 11/2016 | |
| KR | 10-2017-0004172 A | | 1/2017 | |
| KR | 10-2017-0022465 A | | 3/2017 | |
| KR | 10-2017-0033516 A | | 3/2017 | |
| WO | WO-2006035610 A1 | * | 4/2006 | ............ G11C 11/16 |
| WO | WO-2008125257 A1 | * | 10/2008 | ........ H01M 10/0431 |

OTHER PUBLICATIONS

International Search Report (PCT/ISA/210) issued in PCT/KR2019/010867, dated Dec. 30, 2019.

* cited by examiner

HEXAGONAL COLUMN-SHAPED BATTERY CELL, MANUFACTURING METHOD THEREFOR, AND BATTERY MODULE COMPRISING SAME

TECHNICAL FIELD

The present disclosure relates to a hexagonal prism-shaped battery cell and a method for manufacturing the same and a battery module comprising the same. More particularly, the present disclosure relates to a hexagonal prism-shaped battery cell manufactured using an electrode assembly having a structure for preventing an electrode active material from being damaged at the edge of a hexagonal prism by loading the electrode active material onto an electrode current collector at a predetermined interval and a method for manufacturing the same, and a battery module comprising the same. The present application claims the benefit of Korean Patent Application No. 10-2018-0106083 filed on Sep. 5, 2018 with the Korean Intellectual Property Office, the disclosure of which is incorporated herein by reference in its entirety.

BACKGROUND ART

In the manufacture of a battery module including battery cells, the use of a cylindrical battery cell increases an empty space between adjacent battery cells, resulting in low energy density.

Additionally, when a cooling plate is interposed between battery cells for the purpose of cooling, the contact area between the battery cell and the cooling plate is narrow due to the shape of the side of the cylindrical battery cell, resulting in low cooling efficiency.

It is possible to increase the contact area a little bit by bringing the bottom surfaces of the cylindrical battery cells and the cooling plate into contact, but in this case, it takes a long time to transfer heat generated from the center of the battery cell to the bottom, resulting in inefficient cooling.

When the battery cell is manufactured in the shape of a hexagonal prism, it is possible to remove or minimize an empty space between battery cells. To manufacture the hexagonal prism-shaped battery cell, it is desirable to receive a hexagonal prism-shaped electrode assembly in a hexagonal prism-shaped cell case since energy density increases and cooling efficiency is improved through the cell case.

However, in case that the hexagonal prism-shaped electrode assembly is manufactured using the conventional electrode including an electrode active material continuously loaded on an electrode current collector, when bending the electrode, the electrode active material is also bent at the edge of the hexagonal prism where the electrode is bent, and a cracking or peeling phenomenon occurs in the electrode active material, resulting in degradation of the battery cell and the battery module.

Accordingly, there is a need for the development of technology for preventing the damage and/or separation of the electrode active material in the manufacture of the battery cell in the shape of a hexagonal prism.

DISCLOSURE

Technical Problem

The present disclosure is designed to solve the above-described problem, and therefore the present disclosure is directed to providing a battery cell in the shape of a hexagonal prism to increase the energy density when packing battery cells to manufacture a battery module.

The present disclosure is further directed to providing a hexagonal prism-shaped electrode assembly used to manufacture a hexagonal prism-shaped battery cell, having a structure for preventing the electrode active material from being damaged and/or separated at the edge of the hexagonal prism.

However, the technical problem to solve is not limited to the above-described problems, and other problems not mentioned herein will be clearly understood by those skilled in the art from the following detailed description.

Technical Solution

To achieve the above-described object, a battery cell according to an embodiment of the present disclosure includes an electrode assembly having a hollow structure with a hexagonal prism-shaped hole at a center, wherein an exterior of the electrode assembly is in a shape of a hexagonal prism, and a cell case in which the electrode assembly is received, wherein an exterior of the cell case is in a shape of a hexagonal prism.

The electrode assembly may include a first electrode including a first electrode current collector and a first electrode active material coated discontinuously at predetermined intervals on the first electrode current collector to provide a plurality of first electrode active material blocks, a second electrode including a second electrode current collector and a second electrode active material coated discontinuously at predetermined intervals on the second electrode current collector to provide a plurality of second electrode active material blocks, and a separator interposed between the first electrode and the second electrode.

The first electrode may be bent at first uncoated regions between adjacent first electrode active material blocks, and the second electrode may be bent at second uncoated regions between adjacent second electrode active material blocks.

The plurality of first electrode active material blocks may be divided into groups, each said group having six, first electrode active material blocks, and the plurality of second electrode active material blocks may be divided into groups, each said group having six, second electrode active material blocks. As the groups of first electrode active material blocks and the groups of second electrode active material blocks are farther away from a center of a cross section of the electrode assembly, the first electrode active material blocks between adjacent groups increase in length in a circumferential direction of the electrode assembly.

Another separator may be interposed between an outermost surface of the electrode assembly and an inner surface of the cell case.

To achieve the above-described object, a method for manufacturing a battery cell according to an embodiment of the present disclosure includes preparing a first electrode by forming a first electrode active material discontinuously at predetermined intervals on at least one surface of a first electrode current collector to provide a plurality of first electrode active material blocks, preparing a second electrode by forming a second electrode active material block discontinuously at predetermined intervals on at least one surface of a second electrode current collector to provide a plurality of second electrode active material blocks, forming a stack structure including the first electrode, the second electrode and a separator interposed the first electrode and the second electrode, winding the stack structure so that an exterior of an electrode assembly is in a shape of a hexagonal prism, and receiving the wound electrode assembly in a case.

When six first electrode active material blocks of the plurality of first electrode active material blocks form a group in a sequential order from a start point of the winding, lengths of the first electrode active material blocks belonging to a same group may be equal, and the lengths of the first electrode active material blocks belonging to a group that is farther away from the start point of the winding may be longer than the lengths of the first electrode active material blocks belonging to another group closer to the start point.

When six second electrode active material blocks of the plurality of second electrode active material blocks form a group in a sequential order from the start point of the winding, lengths of the second electrode active material blocks belonging to a same group may be equal, and the lengths of the second electrode active material blocks belonging to a group that is farther away from the start point of the winding may be longer than the lengths of the second electrode active material blocks belonging to another group closer to the start point.

The step of winding the stack structure may include bending the stack structure with respect to first uncoated regions between the first electrode active material blocks and to second uncoated regions between the second electrode active material blocks.

To achieve the above-described object, a battery module according to an embodiment of the present disclosure includes a cell assembly including a plurality of battery cells according to an embodiment of the present disclosure, and a cooling plate interposed between one or more opposing surfaces of adjacent battery cells.

Advantageous Effects

According to an aspect of the present disclosure, as a battery module is manufactured by packing hexagonal prism-shaped battery cells, the energy density of the battery module increases.

According to another aspect of the present disclosure, as an electrode assembly used to manufacture a hexagonal prism-shaped battery cell is manufactured in the shape of a hexagonal prism, damage and/or separation of the electrode active material at the edge of the hexagonal prism is prevented.

BRIEF DESCRIPTION OF DRAWINGS

The accompanying drawings illustrate preferred embodiments of the present disclosure and, together with the following detailed description, serve to provide a further understanding of the technical features of the present disclosure. However, the present disclosure is not to be construed as being limited to the drawings.

MODE FOR DISCLOSURE

Figure 1:
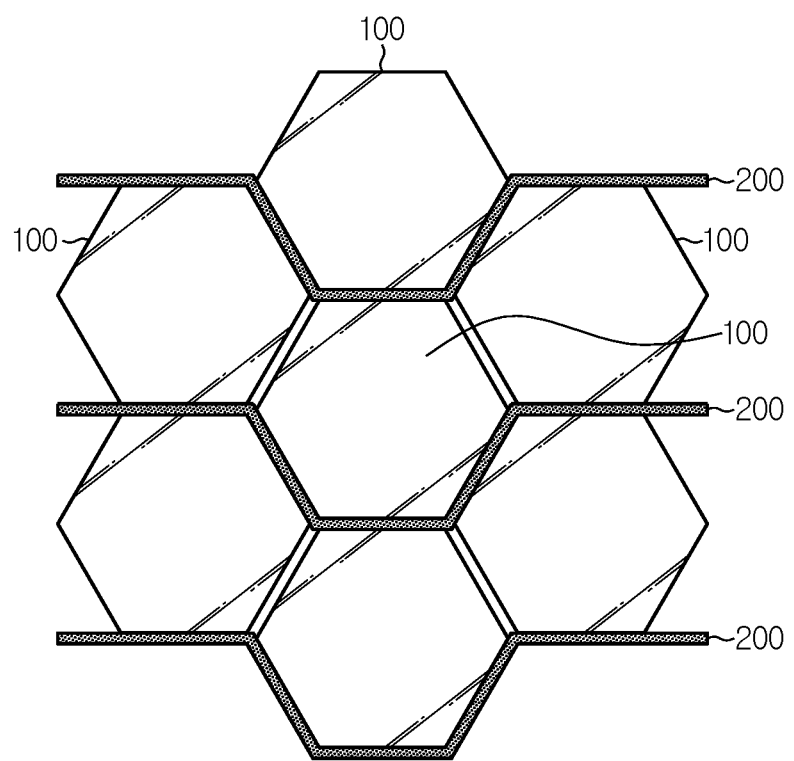
FIG. 1 is a plane view showing a battery module according to an embodiment of the present disclosure.

Hereinafter, preferred embodiments of the present disclosure will be described in detail with reference to the accompanying drawings. Prior to the description, the terms or words used in the specification and the appended claims should not be construed as limited to general and dictionary meanings, and should be interpreted based on the meanings and concepts corresponding to technical aspects of the present disclosure on the basis of the principle that the inventor is allowed to define terms appropriately for the best explanation. Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time of filing the application.

First, referring to FIGS. 1 and 2, a battery module and a battery cell 100 according to an embodiment of the present disclosure will be described.

Figure 2:
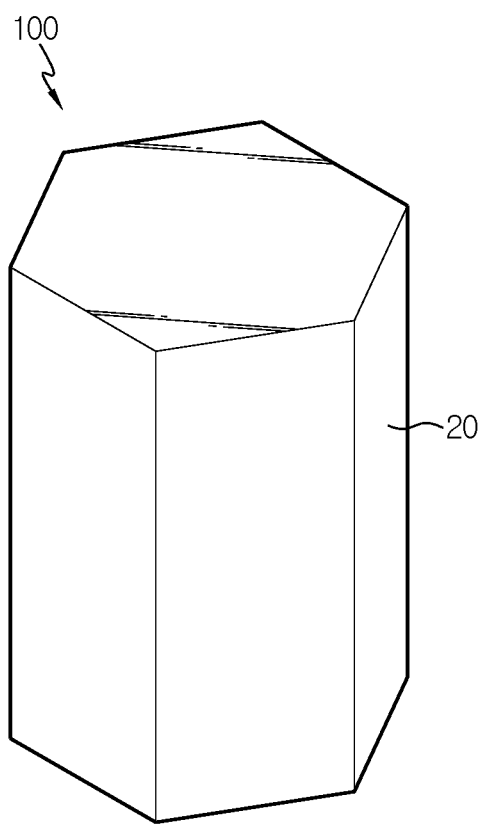
FIG. 2 is a diagram showing a battery cell according to an embodiment of the present disclosure.

FIG. 1 is a plane view showing the battery module according to an embodiment of the present disclosure, and FIG. 2 is a diagram showing the battery cell according to an embodiment of the present disclosure.

Referring to FIGS. 1 and 2, the battery module according to an embodiment of the present disclosure includes a plurality of battery cells 100 and at least one cooling plate 200.

The battery cell 100 is in the shape of an approximately hexagonal prism, and accordingly it has an approximately regular hexagonal shape when viewed from the top.

As the battery cell 100 according to an embodiment of the present disclosure is in the shape of a hexagonal prism, it is possible to remove or minimize en empty space between adjacent battery cells 100 when packing the plurality of battery cells 100.

That is, each of the plurality of battery cells 100 of the battery module has six sides, and it is possible to pack such that all the six sides of one battery cell 100 are in contact with adjacent battery cells 100. Accordingly, the manufacture of the battery module using the hexagonal prism-shaped battery cell 100 according to the present disclosure is very advantageous in terms of energy density.

The cooling plate 200 may be interposed between opposing surfaces of adjacent battery cells 100, and may be made of a metal material for efficient heat transfer. The cooling plate 200 may extend from one side of the battery module to the other side, and may be bent to conform the shape of the battery cell 100 having an approximately regular hexagonal shape when viewed on the plane.

That is, the cooling plate 200 is in surface-to-surface contact with the side of the battery cell 100, and is bent at a location corresponding to the edge on the side of the battery cell 100 to maximize the contact area between the cooling plate 200 and the battery cell 100.

Subsequently, referring to FIG. 3 with FIG. 2, the schematic structure of the battery cell 100 according to an embodiment of the present disclosure will be described.

Figure 3:
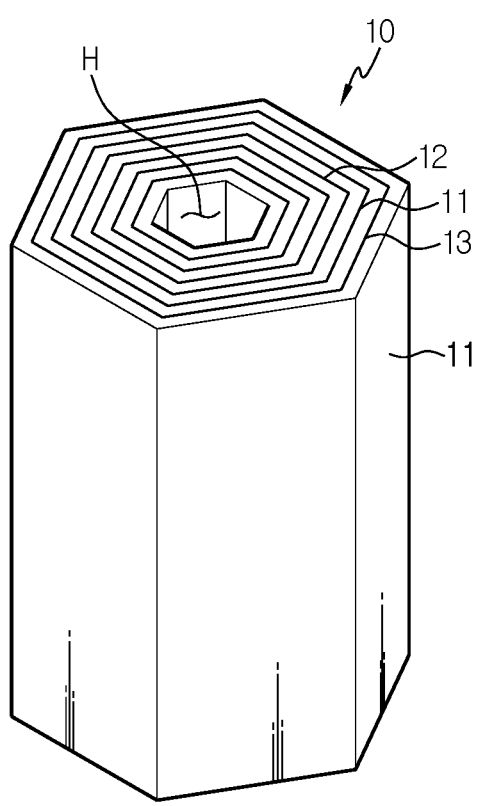
FIG. 3 is a diagram showing an electrode assembly that is applied to a battery cell according to an embodiment of the present disclosure.

FIG. 3 is a diagram showing an electrode assembly that is applied to the battery cell according to an embodiment of the present disclosure.

Referring to FIG. 3 with FIG. 2, the battery cell 100 includes an electrode assembly 10 and a cell case 20 in which the electrode assembly 10 is received.

As the battery cell 100 according to the present disclosure is in the shape of an approximately hexagonal prism as described above, the cell case 20 is also in the shape of an approximately hexagonal prism for such a shape, and has an empty internal space for receiving the electrode assembly 10. Additionally, the electrode assembly 10 has a size that matches the size of the cell case 20, and is in the shape of an approximately hexagonal prism in the same way as the cell case 20.

As described above, the battery cell 100 according to an embodiment of the present disclosure include the hexagonal prism-shaped cell case 20 and the hexagonal prism-shaped electrode assembly 10 that is received in the cell case 20. As the electrode assembly 10 is in the shape of a hexagonal prism, it is possible to maximize the volume of the electrode assembly 10 received in the cell case 20, and as a consequence, the energy density of the battery cell 100.

The electrode assembly 10 has a hollow structure having a hole H in the shape of an approximately hexagonal prism passing therethrough from the upper surface to the lower surface at the center. The hollow structure is formed by winding a stack structure including a first electrode 12, a second electrode 13 and a separator 11 interposed between the first electrode 12 and the second electrode 13 into the shape of a hexagonal prism.

The cell case 20 may be made of a metal material to maintain the shape and ensure the strength, and in this case, an additional separator 11 may be wound on the outermost of the electrode assembly 10 to prevent a short circuit caused by the contact between the electrodes 12, 13 and the cell case 20.

In the present disclosure, the first electrode 12 may be a positive electrode and the second electrode 13 may be a negative electrode, and on the contrary, the first electrode 12 may be a negative electrode and the second electrode 13 may be a positive electrode.

Subsequently, referring to FIGS. 4 and 5, the detailed structure of the electrode assembly 10 applied to the battery cell 100 according to an embodiment of the present disclosure and its manufacturing method will be described.

Figure 4:
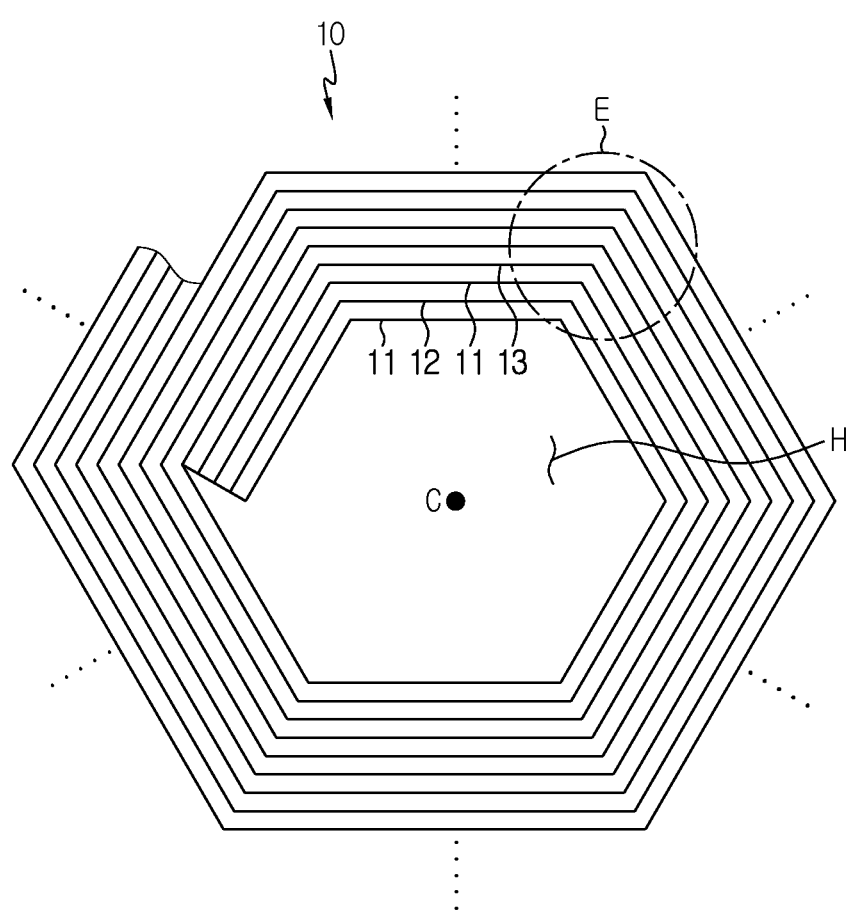
FIG. 4 is a plane view showing the electrode assembly shown in FIG. 3.
Figure 5:
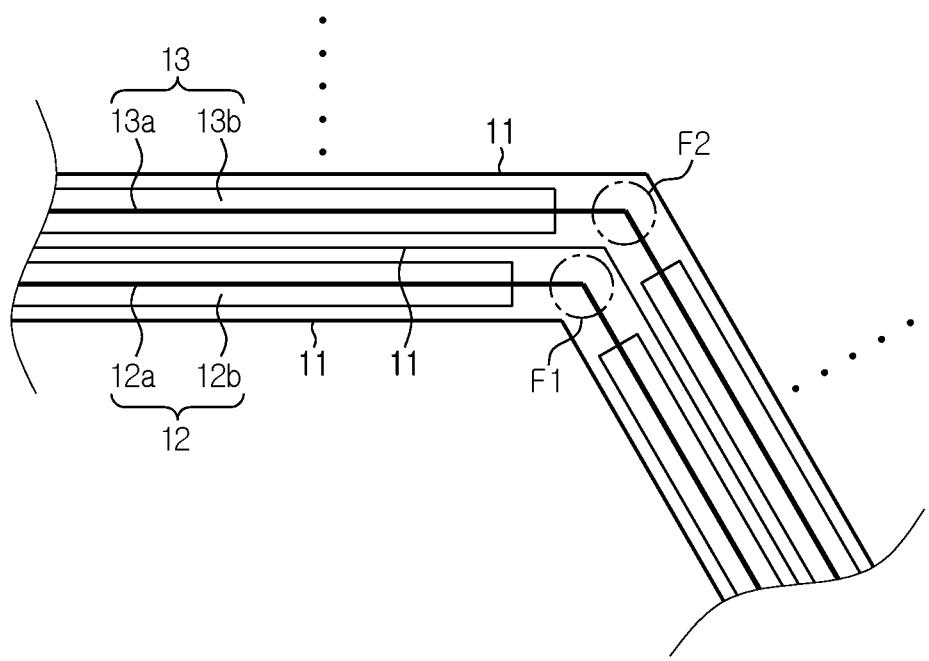
FIG. 5 is an enlarged view of section E in FIG. 4.

FIG. 4 is a plane view showing the electrode assembly shown in FIG. 3, and FIG. 5 is an enlarged view of section E in FIG. 4.

Referring to FIGS. 4 and 5, the electrode assembly 10 includes the first electrode 12, the second electrode 13 and the separator 11 interposed between the first electrode 12 and the second electrode 13. Additionally, the electrode assembly 10 may further include the additional separator 11 wound on the outermost as described above.

The electrode assembly 10 has an approximately regular hexagonal shape on the basis of the plane view seen from the top, and the regular hexagonal shape is obtained by bending the stack structure formed by stacking the electrodes 12, 13 and the separator 11 at predetermined intervals along the lengthwise direction. That is, in the electrode assembly 10, the stack structure is bent at the angle of approximately 60° toward the center C of the winding at predetermined intervals along the lengthwise direction.

The first electrode 12 includes a first electrode current collector 12a and a first electrode active material block 12b formed by a first electrode active material coated on at least one surface of the first electrode current collector 12a. The first electrode active material block 12b is coated discontinuously at predetermined intervals along the lengthwise direction of the first electrode current collector 12a. Accordingly, there is a first uncoated region F1, or a region in which the first electrode active material is not coated, between neighboring first electrode active material blocks 12b.

When winding the stack structure, bending occurs at the first uncoated region F1. That is, the first uncoated region F1 corresponds to the edge of the hexagonal prism in the hexagonal prism-shaped electrode assembly 10.

Likewise, the second electrode 13 includes a second electrode current collector 13a and a second electrode active material block 13b formed by a second electrode active material coated on at least one surface of the second electrode current collector 13a. The second electrode active material block 13b is coated discontinuously at predetermined intervals along the lengthwise direction of the second electrode current collector 13a. Accordingly, there is a second uncoated region F2, or a region in which the second electrode active material is not coated, between neighboring second electrode active material blocks 13b.

When winding the stack structure, bending occurs at the second uncoated region F2. That is, the second uncoated region F2 corresponds to the edge of the hexagonal prism in the hexagonal prism-shaped electrode assembly 10.

As described above, the electrode assembly 10 is in the shape of a hexagonal prism by bending the uncoated regions F1, F2 of the first electrode 12 and the second electrode 13 of the stack structure, and bending does not occur on the electrode active material blocks 12b, 13b, thereby preventing the damage and separation of the electrode active material.

When winding the stack structure including the first electrode/the separator/the second electrode stacked in a sequential order such that it is bent toward the center of winding at predetermined intervals to form electrode assembly in the shape of a hexagonal prism, if the electrode active material exists at the region in which bending occurs, damage such as cracks may occur in the electrode active material or at least parts of the electrode active material may be separated.

To prevent this problem, the present disclosure does not continuously coat the electrode active material on the electrode current collector, and instead, discontinuously coats the electrode active material to form the uncoated region at predetermined intervals, and bends the stack structure at the uncoated region, so that the uncoated region becomes the edge of the hexagonal prism.

The first electrode current collector 12a may be a positive electrode current collector and the second electrode current collector 13a may be a negative electrode current collector, and on the contrary, the first electrode current collector 12a may be a negative electrode current collector and the second electrode current collector 13a may be a positive electrode current collector.

Likewise, the first electrode active material block 12b may be a positive electrode active material block and the second electrode active material block 13b may be a negative electrode active material block, and on the contrary, the first electrode active material block 12b may be a negative electrode active material block and the second electrode active material block 13b may be a positive electrode active material block.

Subsequently, referring to FIGS. 6 to 9, a method for manufacturing the battery cell 10 according to an embodiment of the present disclosure will be described.

Figure 6:
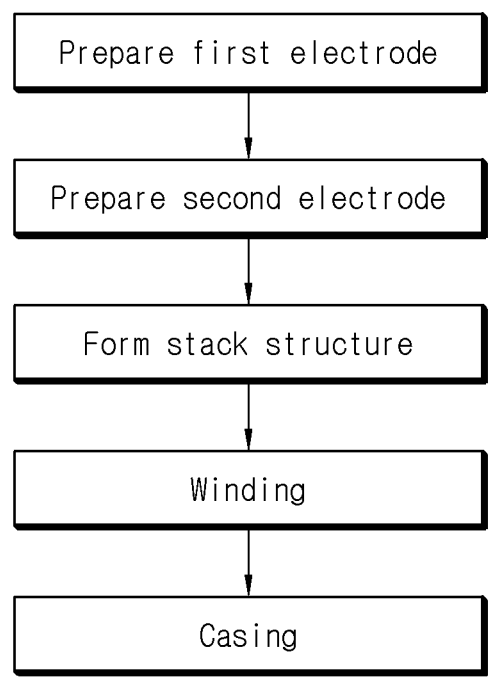
FIG. 6 is a diagram showing a process of manufacturing a battery cell according to an embodiment of the present disclosure.
Figure 8:
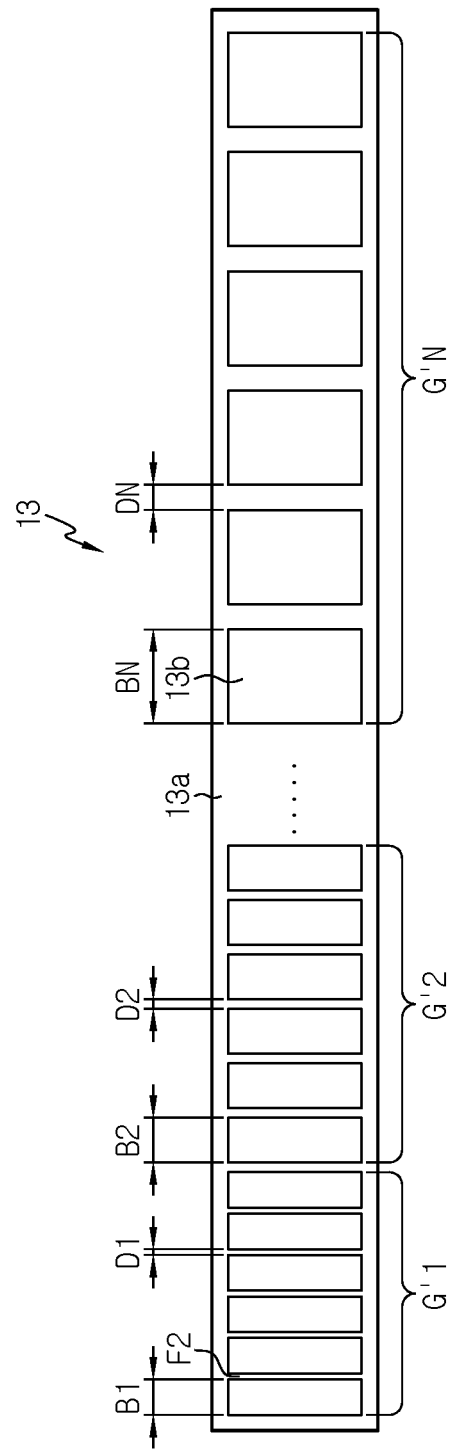
FIG. 8 is a diagram showing an unfolded second electrode in an electrode assembly that is applied to the present disclosure.
Figure 9:
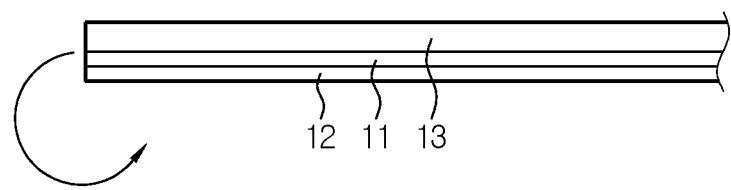
FIG. 9 is a diagram showing a process of winding a stack structure including a separator, a first electrode and a second electrode.

FIG. 6 is a diagram showing a process of manufacturing the battery cell 10 according to an embodiment of the present disclosure. Additionally, FIG. 7 is a diagram showing an unfolded first electrode in the electrode assembly that is applied to the present disclosure, FIG. 8 is a diagram showing an unfolded second electrode in the electrode assembly that is applied to the present disclosure, and FIG. 9 is a diagram showing a process of winding the stack structure including the separator, the first electrode and the second electrode.

First, referring to FIG. 6, the method for manufacturing a battery cell according to an embodiment of the present disclosure includes preparing the first electrode 12; preparing the second electrode 13; forming a stack structure including the first electrode 12, the second electrode 13 and the separator 11 interposed between; winding the stack structure; and a casing step of receiving the electrode assembly 10 in the case 20.

Figure 7:
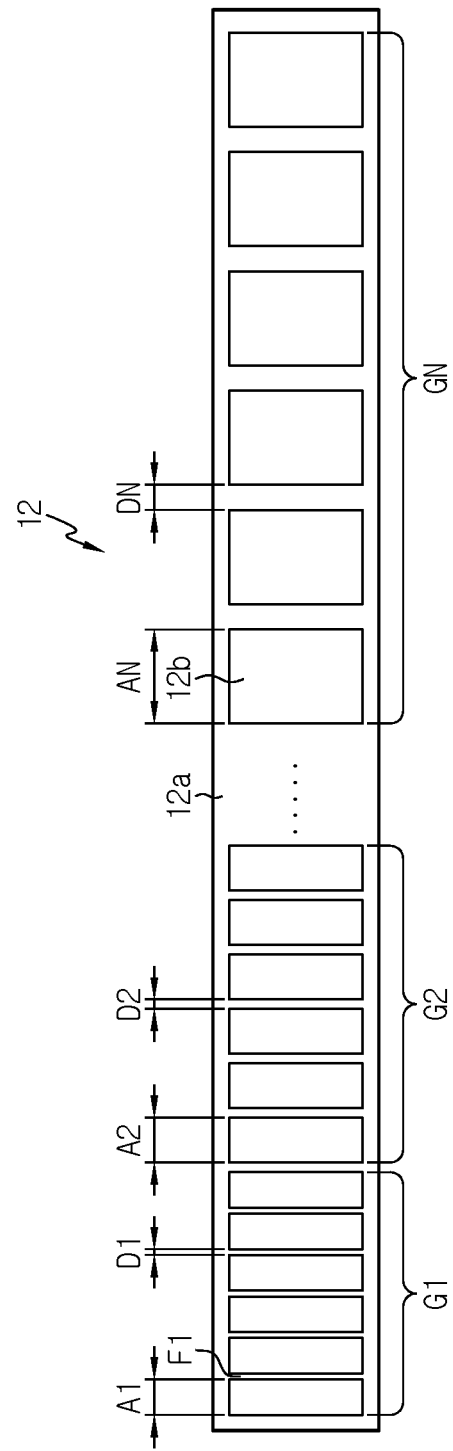
FIG. 7 is a diagram showing an unfolded first electrode in an electrode assembly that is applied to the present disclosure.

Referring to FIG. 7, in the step of preparing the first electrode, a first electrode active material is discontinuously coated on one or two surfaces of the first electrode current collector 12a to form a plurality of first electrode active material blocks 12b.

The plurality of first electrode active material blocks 12b may be grouped to form a group for each six first electrode active material blocks 12b in a sequential order from one side of the lengthwise direction of the first electrode current collector 12a (where winding starts) to the other side. In this case, the first electrode active material blocks 12b belonging to the same group are formed with equal length. Additionally, the first electrode active material blocks 12b belonging to a group that is farther away from the start point of the winding are longer.

For example, when the first electrode active material blocks 12b are grouped into N groups, the length A2 of the first electrode active material blocks 12b belonging to a second group G2 is longer than the length A1 of the first electrode active material blocks 12b belonging to a first group G1, and the length AN of the first electrode active material blocks 12b belonging to an Nth group GN is longest.

This is because in the electrode assembly 10, six first electrode active material blocks 12b of the first group form an innermost hexagonal prism, six first electrode active material blocks 12b of the second group form a hexagonal prism that surrounds the innermost hexagonal prism, and six first electrode active material blocks 12b of the Nth group form an outermost hexagonal prism.

The distances D1, D2, DN between neighboring first electrode active material blocks 12b may be equal within the same group, and may be different between different groups. That is, a group that is farther away from the start point of the winding may have a wider uncoated region F1. For example, the width D2 of the uncoated region F1 formed between the first electrode active material blocks 12b belonging to the second group G2 may be larger than the width D1 of the uncoated region F1 formed between the first electrode active material blocks 12b belonging to the first group G1, and the width DN of the uncoated region F1 formed between the first electrode active material blocks 12b belonging to the Nth group GN may be largest.

Referring to FIG. 8, in the step of preparing the second electrode, the second electrode active material is discontinuously coated on one or two surfaces of the second electrode current collector 13a to form a plurality of second electrode active material blocks 13b.

The plurality of second electrode active material blocks 13b may be grouped to form a group for each six second electrode active material blocks in a sequential order from one side of the lengthwise direction of the second electrode current collector 13a (where winding starts) to the other side. In this case, the second electrode active material blocks 13b belonging to the same group are formed with equal length. Additionally, the second electrode active material blocks 13b belonging to a group that is farther away from the start point of the winding are longer.

For example, when the second electrode active material blocks 13b are grouped into N groups, the length B2 of the second electrode active material blocks 13b belonging to a second group G'2 is larger than the length B1 of the second electrode active material block 13b belonging to a first group G'1, and the length BN of the second electrode active material blocks 13b belonging to an Nth group G'N is largest.

This is because in the electrode assembly 10, six second electrode active material blocks 13b of the first group form an innermost hexagonal prism, six second electrode active material blocks 13b of the second group form a hexagonal prism that surrounds the innermost hexagonal prism, and six second electrode active material blocks 13b of the Nth group form an outermost hexagonal prism.

The distances D1, D2, DN between neighboring second electrode active material blocks 13b may be equal within the same group, and may be different between different groups. That is, a group that is farther away from the start point of the winding may have a wider uncoated region F2. For example, the width D2 of the uncoated region F2 formed between the second electrode active material blocks 13b belonging to the second group G'2 may be larger than the width D1 of the uncoated region F2 formed between the second electrode active material blocks 13b belonging to the first group G'1, and the width DN of the uncoated region F2 formed between the second electrode active material blocks 13b belonging to the Nth group G'N is largest.

In the step of forming the stack structure, the first electrode 12/the separator 11/the second electrode 13 are stacked in a sequential order to form the stack structure having the separator 11 interposed between the first electrode 12 and the second electrode 13.

The step of forming the stack structure may further include placing the additional separator 11 on the outer surface of the first electrode 12 and/or on the outer surface of the second electrode 13. That is, the stack structure prepared through the step of forming the stack structure may have a sequential stack of the separator 11/the first electrode 12/the separator 11/the second electrode 13/the separator 11, or a sequential stack of the first electrode 12/the separator 11/the second electrode 13/the separator 11, or a sequential stack of the separator 11/the first electrode 12/the separator 11/the second electrode 13.

Referring to FIG. 9, in the step of winding the stack structure, the stack structure is wound in the direction of the arrow such that the first electrode 12 forms an innermost layer. As opposed to FIG. 9, when the separator 11 is placed on the outermost of the stack structure, the step of winding the stack structure corresponds to the step of winding the stack structure in the direction of the arrow such that the separator 11 forms an innermost layer.

In the step of winding the stack structure, the stack structure is wound in the direction of the arrow shown in FIG. 9, and the electrode assembly 10 (see FIG. 3) is formed in the shape of an approximately hexagonal prism by stacking such that the electrode current collectors 12*a*, 13*a* are bent at the uncoated regions F1, F2 shown in FIGS. 7 and 8.

In the casing step, the electrode assembly 10 (see FIG. 3) in the shape of an approximately hexagonal prism through the winding step is received in the hexagonal prism-shaped cell case 20 (see FIG. 2).

The method may further include the step of winding the separator 11 on the outer surface of the electrode assembly 10 between the winding step and the casing step. That is, the separator 11 may be or may not be disposed on the outermost of the stack structure as described above, and when the separator 11 is not disposed on the outermost of the stack structure, the second electrode 13 is disposed at the outermost of the electrode assembly 10 completed by winding the stack structure.

When the second electrode 13 is disposed at the outermost of the electrode assembly 10, the second electrode 13 may come into contact with the inner surface of the cell case 20, and as a consequence, a short circuit may occur. Accordingly, it is necessary to wind the separator 11 on the outer surface of the electrode assembly 10 to prevent a short circuit.

As described above, the battery cell 100 according to an embodiment of the present disclosure includes the electrode assembly 10 and the cell case 20 both in the shape of an approximately hexagonal prism (in more detail, the shape of a hexagonal prism having an approximately regularly hexagonal shape in cross section), thereby maximizing the energy density when manufacturing the battery module by packing the plurality of battery cells 100. Additionally, the battery cell 100 according to an embodiment of the present disclosure has the uncoated regions F1, F2 at each location corresponding to the edge of the hexagonal prism to prevent the damage or separation of the electrode active materials 12*b*, 13*b* at the edge of the hexagonal prism.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery cell, comprising:
    an electrode assembly having a hollow structure with a hexagonal prism-shaped hole at a center, wherein an exterior of the electrode assembly is in a shape of a hexagonal prism; and
    a cell case in which the electrode assembly is received, wherein an exterior of the cell case is in a shape of a hexagonal prism,
    wherein the electrode assembly includes:
        a first electrode including a first electrode current collector and a first electrode active material coated discontinuously at predetermined intervals on the first electrode current collector to provide a plurality of first electrode active material blocks;
        a second electrode including a second electrode current collector and a second electrode active material coated discontinuously at predetermined intervals on the second electrode current collector to provide a plurality of second electrode active material blocks; and
        a separator interposed between the first electrode and the second electrode, and
        wherein the first electrode is bent at first uncoated regions between adjacent first electrode active material blocks at approximately 60°, and
        the second electrode is bent at second uncoated regions between adjacent second electrode active material blocks at approximately 60°.

2. The battery cell according to claim 1, wherein the plurality of first electrode active material blocks are divided into groups, each said group having six, first electrode active material blocks, lengths of the first electrode active material blocks belonging to a same group are equal, and the plurality of second electrode active material blocks are divided into groups, each said group having six, second electrode active material blocks, lengths of the second electrode active material blocks belonging to a same group are equal, and
    wherein, as the groups of first electrode active material blocks and the groups of second electrode active material blocks are farther away from a center of a cross section of the electrode assembly, the first electrode active material blocks and the second electrode active material blocks between adjacent groups increase in length in a circumferential direction of the electrode assembly.

3. The battery cell according to claim 1, wherein another separator is interposed between an outermost surface of the electrode assembly and an inner surface of the cell case.

4. A method for manufacturing a battery cell, comprising:
    preparing a first electrode by forming a first electrode active material discontinuously at predetermined intervals on at least one surface of a first electrode current collector to provide a plurality of first electrode active material blocks;
    preparing a second electrode by forming a second electrode active material discontinuously at predetermined intervals on at least one surface of a second electrode current collector to provide a plurality of second electrode active material blocks;
    forming a stack structure including the first electrode, the second electrode and a separator interposed the first electrode and the second electrode;
    winding the stack structure so that an exterior of an electrode assembly is in a shape of a hexagonal prism; and
    receiving the wound electrode assembly in a case,
    wherein winding the stack structure comprises bending the stack structure with respect to first uncoated regions between the first electrode active material blocks at approximately 60° and bending the stack structure with respect to second uncoated regions between the second electrode active material blocks at approximately 60°.

5. The method for manufacturing a battery cell according to claim 4, wherein, when six first electrode active material blocks of the plurality of first electrode active material blocks form a group in a sequential order from a start point of the winding, lengths of the first electrode active material blocks belonging to a same group are equal, and the lengths of the first electrode active material blocks belonging to a group that is farther away from the start point of the winding are longer than the lengths of the first electrode active material blocks belonging to another group closer to the start point.

6. The method for manufacturing a battery cell according to claim 5, wherein, when six second electrode active material blocks of the plurality of second electrode active material blocks form a group in a sequential order from the start point of the winding, the lengths of second electrode active material blocks belonging to a same group are equal, and the lengths of the second electrode active material blocks belonging to a group that is farther away from the start point of the winding are longer than the lengths of the first electrode active material blocks belonging to another group closer to the start point.

7. A battery module comprising:
- a cell assembly comprising a plurality of battery cells, each of the battery cells being according to claim 1; and
- a cooling plate have a plurality of straight, planar portions, at least some of the straight, planar portions being interposed between opposing surfaces of adjacent battery cells.

* * * * *